(No Model.)

A. E. ANDREAE.
CARRIAGE.

No. 595,687.  Patented Dec. 21, 1897.

Witnesses
E. B. Bolton
Otto Wunck

Inventor:
Augusta Emilie Andreae
By　　　　　　
her Attorneys.

THE NORRIS PETERS CO., PHOTO-LITHO., WASHINGTON, D. C.

UNITED STATES PATENT OFFICE.

AUGUSTA EMILIE ANDREAE, OF LONDON, ENGLAND.

CARRIAGE.

SPECIFICATION forming part of Letters Patent No. 595,687, dated December 21, 1897.

Application filed August 28, 1897. Serial No. 649,836. (No model.) Patented in England March 17, 1897, No. 6,946.

*To all whom it may concern:*

Be it known that I, AUGUSTA EMILIE ANDREAE, a subject of the Queen of Great Britain, and a resident of 15 Kensington Gore, Queen's Gate, London, W., England, have invented certain new and useful Improvements in Carriages, (for which I have obtained Letters Patent in Great Britain, No. 6,946, bearing date March 17, 1897,) of which the following is a specification.

My invention relates to improvements in carriages, particularly of the type known as "victorias;" and the object of my improvements is to make the extra folding seat, when such a seat is applied at the back of the driving-box, more comfortable than such seats usually are. To accomplish this object, I form and hinge the additional seat in the usual or other convenient manner, and I apply a cushioned back, hinged and jointed or otherwise arranged so that it can readily be folded or collapsed and turned or pushed backward into the body of the carriage under the driving-box.

Figure 1:
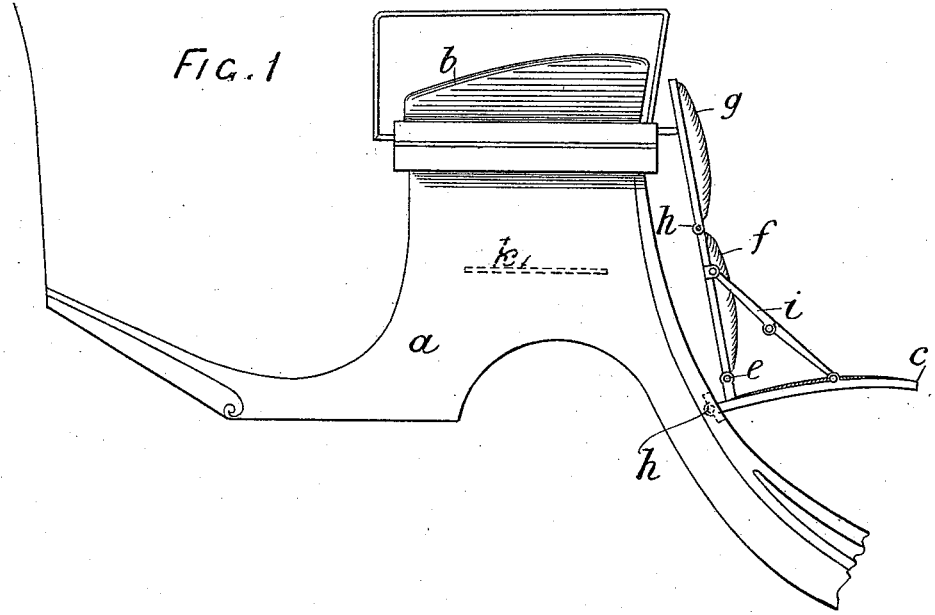
Figure 2:
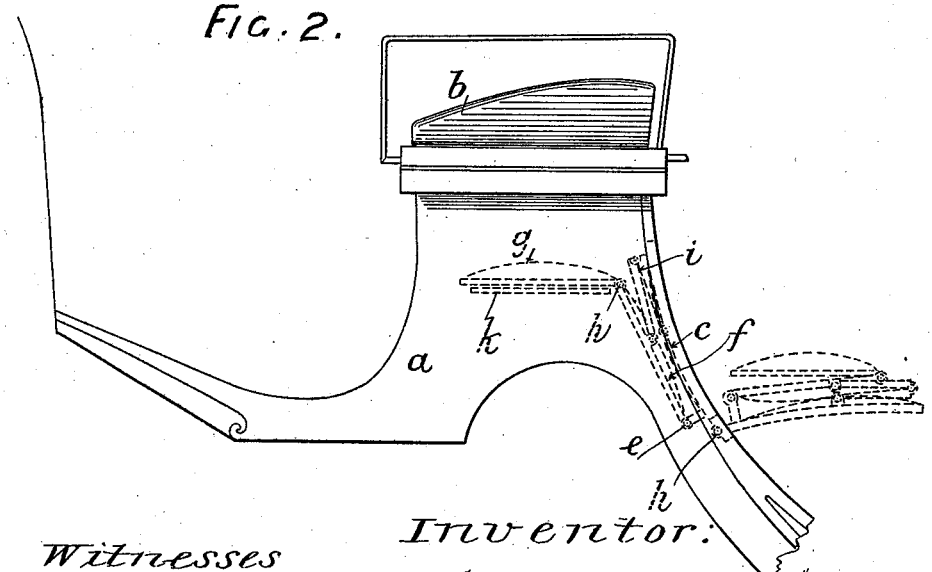

In the accompanying sheet of drawings, Figures 1 and 2 are side elevations of part of a victoria to which my improvements are applied.

In the views, $a$ designates the body of the carriage; $b$, the driver's seat, and $c$ the extra seat, which is hinged to the body at $d$. To the seat $c$ is hinged at $e$ a cushioned back, formed in two parts $f\,g$. The upper part $g$ is connected to the lower $f$ by a knife-joint $h$, and the lower part is stayed at each side by a pair of folding jointed rods $i$.

When in use, the seat $c$, with its cushioned back $f\,g$, occupies the position shown in Fig. 1; but when not required the back is first collapsed and then turned back into the body of the carriage, the part $g$ being supported on ledges $k$, fixed below the driver's seat, inside the body $a$, under the driving-box, the two positions being indicated by dotted lines, Fig. 2.

In order to make more room for the hat or other head-covering of the occupant of the extra seat, I may, if preferred, mount the driver's seat $b$ in slides, so that it can be moved a short distance forward when the extra seat is in use.

Having now particularly described and ascertained the nature of my said invention and in what manner the same is to be performed, I declare that what I claim, and desire to secure by Letters Patent of the United States, is—

In combination with the seat $b$ having a space beneath it, the seat $c$ hinged to the body of the vehicle in rear of the seat $b$, a collapsible back extending up from the pivoted end of the seat $c$ alongside of the frame in rear of the seat $b$ and the supports below the seat $b$ for the collapsible seat, substantially as described.

In witness whereof I have hereunto set my hand in presence of two witnesses.

AUGUSTA EMILIE ANDREAE.

Witnesses:
LYDIA M. ANDREAE,
MAGPIP MACKIE.